(12) United States Patent
Moriya et al.

(10) Patent No.: US 10,165,155 B2
(45) Date of Patent: Dec. 25, 2018

(54) IMAGE PROCESSING DEVICE

(71) Applicant: Sharp Kabushiki Kaisha, Osaka-shi, Osaka (JP)

(72) Inventors: Masaaki Moriya, Osaka (JP); Yoshimitsu Murahashi, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 18 days.

(21) Appl. No.: 14/912,589

(22) PCT Filed: Aug. 11, 2014

(86) PCT No.: PCT/JP2014/071235
§ 371 (c)(1),
(2) Date: Feb. 17, 2016

(87) PCT Pub. No.: WO2015/029765
PCT Pub. Date: Mar. 5, 2015

(65) Prior Publication Data
US 2016/0205288 A1    Jul. 14, 2016

(30) Foreign Application Priority Data
Aug. 29, 2013   (JP) ................................ 2013-178321

(51) Int. Cl.
*H04N 5/06* (2006.01)
*G09G 5/18* (2006.01)
*G09G 5/00* (2006.01)

(52) U.S. Cl.
CPC ............... *H04N 5/06* (2013.01); *G09G 5/006* (2013.01); *G09G 5/18* (2013.01)

(58) Field of Classification Search
CPC ....................................................... H40N 5/06
See application file for complete search history.

(56) References Cited

U.S. PATENT DOCUMENTS

2009/0201272 A1*  8/2009  Ahn ..................... G09G 3/2096
                                                                    345/204
2013/0155124 A1*  6/2013  Tsuge ...................... G09G 5/10
                                                                    345/690

FOREIGN PATENT DOCUMENTS

JP          2003029717 A      1/2003
JP          2007041437 A      2/2007
(Continued)

OTHER PUBLICATIONS

ISA Japanese Patent Office, International Search Report Issued in Patent Application No. PCT/JP2014/071235, dated Oct. 21, 2014, WIPO, 2 pages.

*Primary Examiner* — Samira Monshi
(74) *Attorney, Agent, or Firm* — Alleman Hall Creasman & Tuttle LLP

(57) ABSTRACT

An image processing unit receives at least a clock signal, a data enable signal, and an image signal, and outputs at least the clock signal, the data enable signal, and a processed image signal. The image processing unit includes an interface, an estimated vertical synchronizing signal generator, and an image signal processor. The interface receives the clock signal and the data enable signal, and outputs the clock signal and the data enable signal. The estimated vertical synchronizing signal generator generates an estimated vertical synchronizing signal based on the clock signal and the data enable signal. The image signal processor receives the image signal, generates the processed image signal by performing, on the image signal, predetermined processing that uses the estimated vertical synchronizing signal, and outputs the generated processed image signal.

8 Claims, 8 Drawing Sheets

(56) References Cited

FOREIGN PATENT DOCUMENTS

| JP | 4040712 B2 | 1/2008 |
|---|---|---|
| JP | 2012191304 A | 10/2012 |

\* cited by examiner

IMAGE PROCESSING DEVICE

TECHNICAL FIELD

The present invention relates to an art which enables estimation of a vertical synchronizing signal and image signal processing by use of the estimated vertical synchronizing signal, even without a vertical synchronizing signal.

BACKGROUND ART

In displaying an image signal on a display device, such as a liquid crystal television, there are cases where: (1) the image signal is displayed in a SYNC mode (synchronizing mode); (2) the image signal is displayed in a SYNC-DE mode; and (3) the image signal is displayed in a DE mode (data enable mode).

In the case where the image signal is displayed in the SYNC mode (synchronizing mode), on the display device, the image signal (image data) is displayed by using a vertical synchronizing signal, a horizontal synchronizing signal, and a main clock signal. Further, in the case where the image signal is displayed in the SYNC-DE mode, on the display device, the image signal (image data) is displayed by using a vertical synchronizing signal, a horizontal synchronizing signal, a data enable signal, and a main clock signal.

Whereas, in the case where the image signal is displayed in the DE mode, on the display device, the image signal (image data) is displayed by using a data enable signal and a main clock signal without using a vertical synchronizing signal and a horizontal synchronizing signal.

In the DE mode, since the vertical synchronizing signal does not exist, there is a case where the number of a line to which inputted image data belongs among the lines in one frame cannot be grasped, and as a result, image processing in a vertical direction cannot suitably be performed.

For example, with the art disclosed in Patent Document 1 (JP4040712B), in the DE mode, a pre-charge start vertical (STV) signal is generated at a predetermined timing based on a blanking period of the data enable signal. Further, with the art disclosed in Patent Document 1, a gate in a display panel is turned on in response to the generated pre-charge STV signal, before receiving a main STV signal indicating a timing at which actual data (image data) is inputted. Thus, with the art disclosed in Patent Document 1, a driving speed of the gate can be increased. In other words, with the art of Patent Document 1, in the DE mode in which the vertical synchronizing signal does not exist, a timing which is originally determined based on the vertical synchronizing signal can be grasped by using a signal (pre-charge STV signal) generated based on the data enable signal.

DISCLOSURE OF THE INVENTION

Problems to be Solved by the Invention

However, with the art disclosed in Patent Document 1, it is preconditioned to detect a predetermined timing preceding, by a period of time corresponding to two clock pulse vertical signals (CPV signals) from a timing at which the blanking period of the data enable signal ends (a timing immediately before the blanking period ends). Therefore, it is difficult to generate a signal corresponding to the vertical synchronizing signal at a time point close to a starting time point of the blanking period of the data enable signal.

Therefore, in view of the above situations, the present invention aims to realize an image processing device, which can generate, based on a data enable signal, a vertical synchronizing signal obtained by estimation (estimated vertical synchronizing signal) at a time point close to a starting time point of a blanking period of the data enable signal (a period corresponding to a vertical blanking period), even without a vertical synchronizing signal.

SUMMARY OF THE INVENTION

To solve the above problems, an image processing device with a first configuration is an image processing device for receiving at least a clock signal, a data enable signal, and an image signal, and outputting at least the clock signal, the data enable signal, and a processed image signal, and includes an interface module, an estimated vertical synchronizing signal generator, and an image signal processor.

The interface module receives the clock signal and the data enable signal, and outputs the clock signal and the data enable signal.

The estimated vertical synchronizing signal generator generates an estimated vertical synchronizing signal based on the clock signal and the data enable signal.

The image signal processor receives the image signal, generates the processed image signal by performing, on the image signal, predetermined processing that uses the estimated vertical synchronizing signal generated by the estimated vertical synchronizing signal generator, and outputs the generated processed image signal.

Effects of the Invention

According to the present invention, an image processing device, which can generate, based on a data enable signal, a vertical synchronizing signal obtained by estimation (estimated vertical synchronizing signal) at a time point close to a starting time point of a blanking period of the data enable signal (a period corresponding to a vertical blanking period), even without a vertical synchronizing signal, can be realized.

MODES FOR CARRYING OUT THE INVENTION

First Embodiment

Hereinafter, a first embodiment is described with reference to the drawings.

<1.1: Configuration of Image Signal Processing Apparatus>

Figure 1:
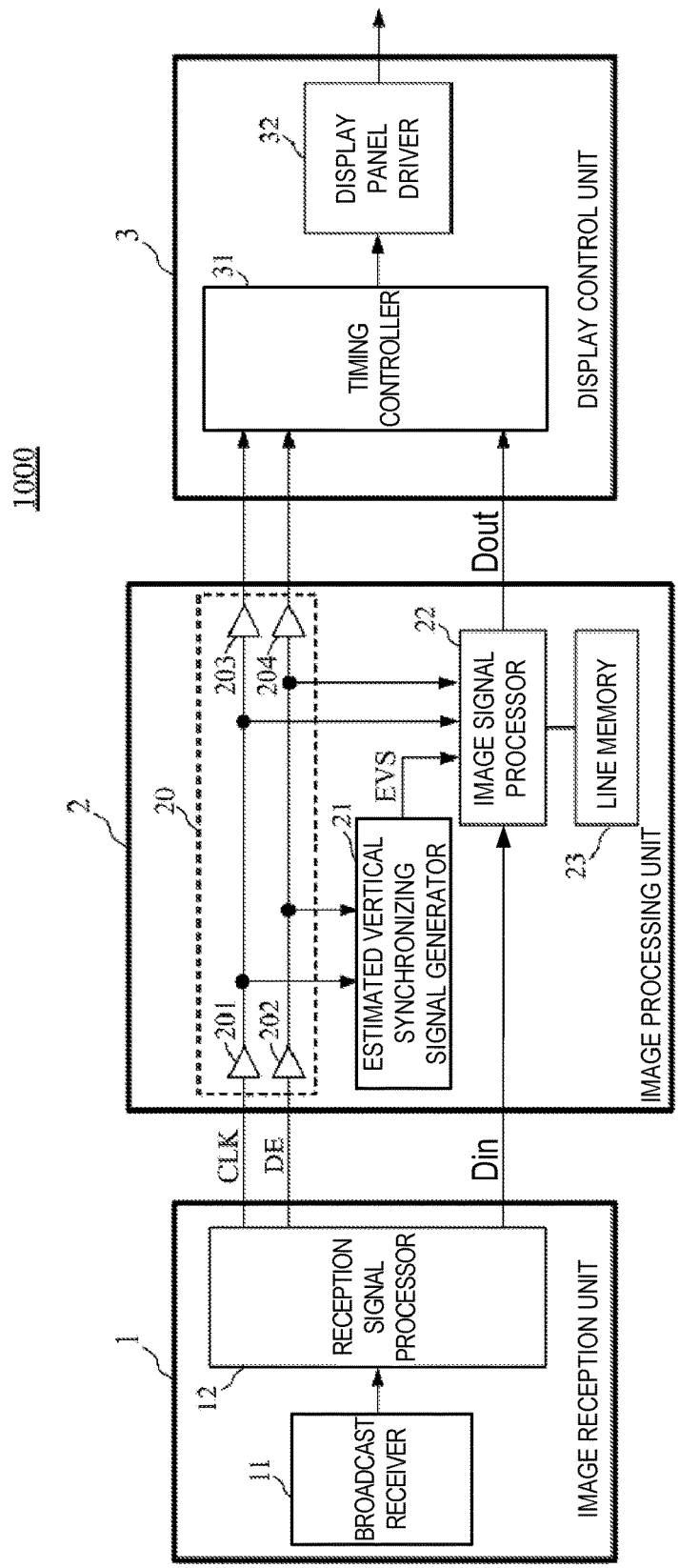
FIG. 1 is a schematic configuration view of an image signal processing apparatus 1000 according to a first embodiment.

FIG. 1 is a schematic configuration view of an image signal processing apparatus 1000 according to the first embodiment. Note that FIG. 1 is a schematic configuration view of the image signal processing apparatus 1000 in a case where an image signal is processed in a DE mode (data enable mode), and omits connections, etc., applied in a case where the image signal is processed in one of a SYNC mode (synchronizing mode) and a SYNC-DE mode.

Figure 2:
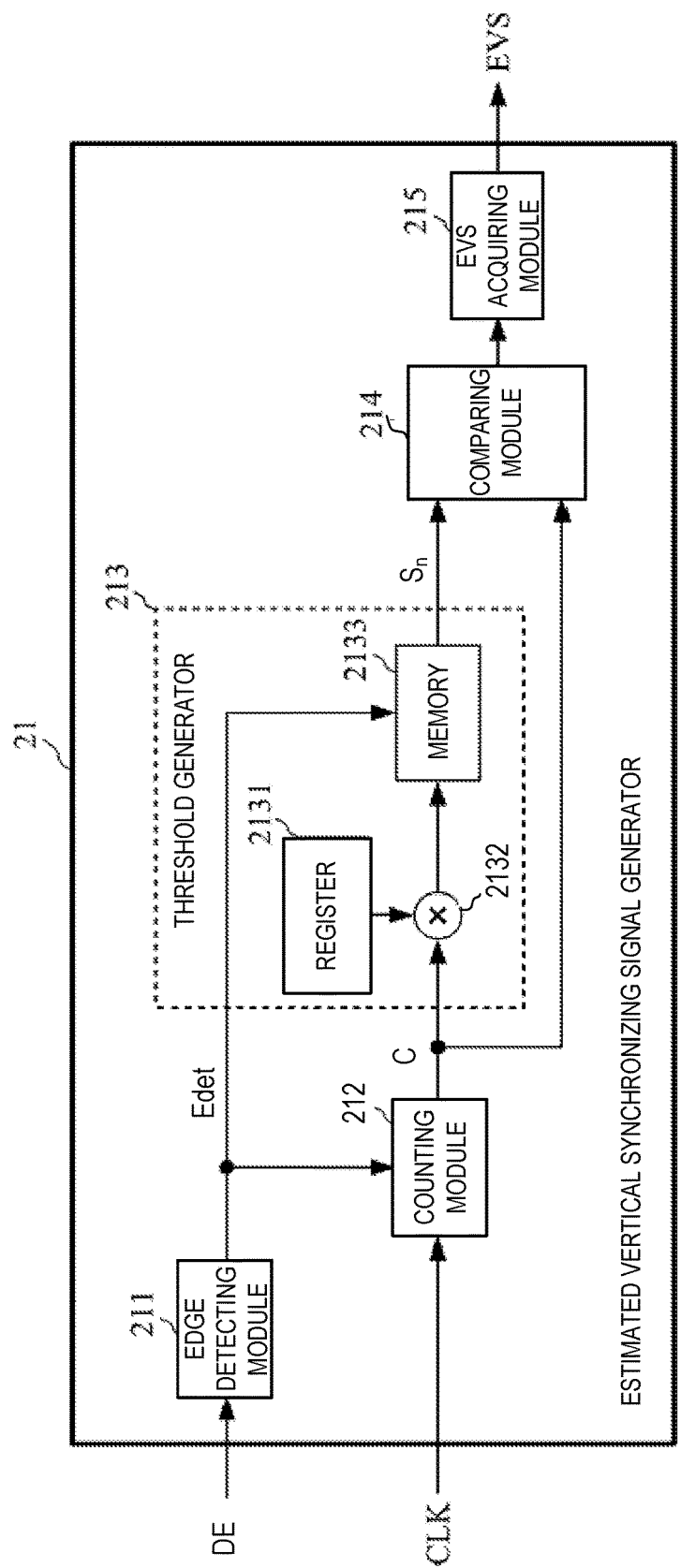
FIG. 2 is a schematic configuration view of an estimated vertical synchronizing signal generator 21 of the image signal processing apparatus 1000.

FIG. 2 is a schematic configuration view of an estimated vertical synchronizing signal generator 21 of the image signal processing apparatus 1000.

As illustrated in FIG. 1, the image signal processing apparatus 1000 includes an image reception unit 1, an image processing unit 2, and a display control unit 3.

As illustrated in FIG. 1, the image reception unit 1 includes a broadcast receiver 11 and a reception signal processor 12.

The broadcast receiver 11 receives, for example, a broadcast wave of a television signal and outputs the received broadcast wave (signal) to the reception signal processor 12.

The reception signal processor 12 receives the signal outputted from the broadcast receiver 11, and performs demodulation, etc. on the received signal to acquire a baseband image signal. Then the reception signal processor 12 outputs, as an image signal Din, the acquired baseband image signal to the image processing unit 2.

Further, the reception signal processor 12 generates a clock signal (main clock signal) CLK and a data enable signal DE which are used for processing the acquired baseband image signal, and outputs the generated clock signal CLK and the data enable signal DE to the image processing unit 2.

As illustrated in FIG. 1, the image processing unit 2 includes an interface 20, the estimated vertical synchronizing signal generator 21, an image signal processor 22, and a line memory 23.

As illustrated in FIG. 1, the interface 20 includes an input buffer 201 for the clock signal CLK, an input buffer 202 for the data enable signal DE, an output buffer 203 for the clock signal CLK, and an output buffer 204 for the data enable signal DE.

The input buffer 201 for the clock signal CLK is, for example, a buffer with high input impedance and low output impedance, and receives the clock signal CLK outputted from the reception signal processor 12. The input buffer 201 outputs the received clock signal CLK to the estimated vertical synchronizing signal generator 21, the image signal processor 22, and the output buffer 203.

The input buffer 202 for the data enable signal DE is, for example, a buffer with high input impedance and low output impedance, and receives the data enable signal DE outputted from the reception signal processor 12. The input buffer 202 outputs the received data enable signal DE to the estimated vertical synchronizing signal generator 21, the image signal processor 22, and the output buffer 204.

The output buffer 203 for the clock signal CLK is, for example, a buffer with high input impedance and low output impedance, and receives the clock signal CLK outputted from the input buffer 201. The output buffer 203 outputs the received clock signal CLK to a timing controller 31 of the display control unit 3.

The output buffer 204 for the data enable signal DE is, for example, a buffer with high input impedance and low output impedance, and receives the data enable signal DE outputted from the input buffer 202. The output buffer 204 outputs the received data enable signal DE to the timing controller 31 of the display control unit 3.

Note that in the interface 20, a delayer for timing adjustment may be provided at the clock signal line and/or the data enable signal line.

As illustrated in FIG. 2, the estimated vertical synchronizing signal generator 21 includes an edge detecting module 211, a counting module 212, a threshold generator 213, a comparing module 214, and an Estimated Vertical Sync (EVS) acquiring module 215.

The edge detecting module 211 receives the data enable signal DE outputted from the interface 20. The edge detecting module 211 detects a rising edge (or a falling edge) of the received data enable signal DE, and outputs, as an edge detection signal Edet, a signal indicating the detection result to the counting module 212, and a memory 2133.

The counting module 212 receives the clock signal CLK outputted from the interface 20 and the edge detection signal Edet outputted from the edge detecting module 211. The counting module 212 performs counting with the clock signal CLK. Specifically, the counting module 212 performs: (1) resetting of the count value (resetting of the count value to "0") when the edge detection signal Edet has a signal value indicating that the rising edge (or the falling edge) portion of the data enable signal DE is detected; and (2) counting with the clock signal CLK in other cases. In other words, the counting module 212 counts a clock number of the clock signal CLK inputted into the counting module 212.

The counting module 212 outputs, as a counter value C, the counted value to a multiplier 2132 and the comparing module 214.

As illustrated in FIG. 2, the threshold generator 213 includes a register 2131, the multiplier 2132, and the memory 2133.

The register 2131 holds information of a coefficient k which is multiplied by the counter value C at the multiplier 2132. Note that the coefficient k held by the register 2131 may be changeable according to an external instruction. The register 2131 outputs the held coefficient k to the multiplier 2132.

The multiplier 2132 receives the counter value C outputted from the counting module 212 and the coefficient k outputted from the register 2131. The multiplier 2132 multiplies the counter value C by the coefficient k, and outputs the multiplication result (k×C) to the memory 2133.

The memory 2133 receives the multiplication result (k×C) outputted from the multiplier 2132 and the edge detection signal Edet outputted from the edge detecting module 211. The memory 2133 stores the multiplication result (k×C) obtained when the edge detection signal Edet has the signal value indicating that the rising edge (or the falling edge) portion of the data enable signal DE is detected.

Further, the memory 2133 outputs, as a threshold $S_n$, a previously-stored multiplication result (k×C) to the comparing module 214.

The comparing module 214 receives the counter value C outputted from the counting module 212 and the threshold $S_n$ outputted from the memory 2133 of the threshold generator 213. The comparing module 214 compares the counter value C with the threshold $S_n$ and outputs a signal indicating the comparison result to the EVS acquiring module 215.

The EVS acquiring module 215 receives the signal indicating the comparison result from the comparing module 214. If the signal indicating the comparison result is changed from having a signal value indicating $C<S_n$ (e.g., signal value of "0") to having a signal value indicating $C \geq S_n$ (e.g., signal value of "1"), the EVS acquiring module 215 outputs, as an estimated vertical synchronizing signal EVS, a signal of which the signal value is active for a predetermined period of time (e.g., a period of one clock cycle), to the image signal processor 22.

The image signal processor 22 receives the image signal Din outputted from the reception signal processor 12 of the image reception unit 1, and the estimated vertical synchronizing signal EVS outputted from the estimated vertical synchronizing signal generator 21. Further, the image signal processor 22 receives the clock signal CLK and the data enable signal DE outputted from the interface 20. The image signal processor 22 performs, for example, image signal processing in a horizontal direction on the image signal Din by using the clock signal CLK, the data enable signal DE, and the estimated vertical synchronizing signal EVS. Then, the image signal processor 22 outputs as an image signal Dout, the image signal after the image signal processing to the display control unit 3.

Further, the image signal processor 22 is connected with the line memory 23, as illustrated in FIG. 1. For example, when performing image signal processing in a vertical direction, the image signal processor 22 may suitably cause the line memory 23 to store in memory the image signal and perform predetermined image signal processing. Note that the line memory 23 may be provided inside the image signal processor 22.

As illustrated in FIG. 1, the line memory 23 is connected with the image signal processor 22 and stores predetermined image signals (e.g., image data for N lines (N: natural number)) based on an instruction from the image signal processor 22. Further, the line memory 23 outputs the stored image signals (image data) to the image signal processor 22 based on an instruction from the image signal processor 22.

As illustrated in FIG. 1, the display control unit 3 includes the timing controller 31 and a display panel driver 32.

As illustrated in FIG. 1, the timing controller 31 receives the clock signal CLK and the data enable signal DE outputted from the image processing unit 2, and the image signal Dout outputted from the image signal processor 22. The timing controller 31 generates a drive signal for displaying the image signal on a display panel (not illustrated), based on the clock signal CLK and the data enable signal DE. Further, the timing controller 31 outputs the image signal (image data) to be displayed on the display panel, as well as the generated drive signal to the display panel driver 32.

The display panel driver 32 receives the drive signal and the image signal (image data) outputted from the timing controller 31. The display panel driver 32 displays the image signal on the display panel by driving the display panel (e.g., driving a gate line and a source line of the display panel) based on the drive signal.

Note that the image signal processing apparatus 1000 may include a display panel (not illustrated) that is controlled by the display control unit 3 to display the image signal. The display panel is realized by a liquid crystal display panel, for example.

<1.2: Operation of Image Signal Processing Apparatus>

Hereinafter, operation of the image signal processing apparatus 1000 configured as above is described.

At the image reception unit 1, for example, the broadcast wave of the television signal is received and the received broadcast wave (signal) is outputted to the reception signal processor 12.

At the reception signal processor 12, demodulation, etc., are performed on the signal outputted from the broadcast receiver 11, to acquire the baseband image signal Din. Then, the acquired baseband image signal Din is outputted to the image signal processor 22 of the image processing unit 2.

Further at the reception signal processor 12, the clock signal (main clock signal) CLK and the data enable signal DE which are used for processing the acquired baseband image signal are generated. Then, the generated clock signal CLK and data enable signal DE are outputted to the image processing unit 2.

At the estimated vertical synchronizing signal generator 21 of the image processing unit 2, the estimated vertical synchronizing signal EVS is generated based on the clock signal CLK and the data enable signal DE outputted from the reception signal processor 12.

The generation of the estimated vertical synchronizing signal EVS at the estimated vertical synchronizing signal generator 21 is described with reference to FIG. 3.

Figure 3:
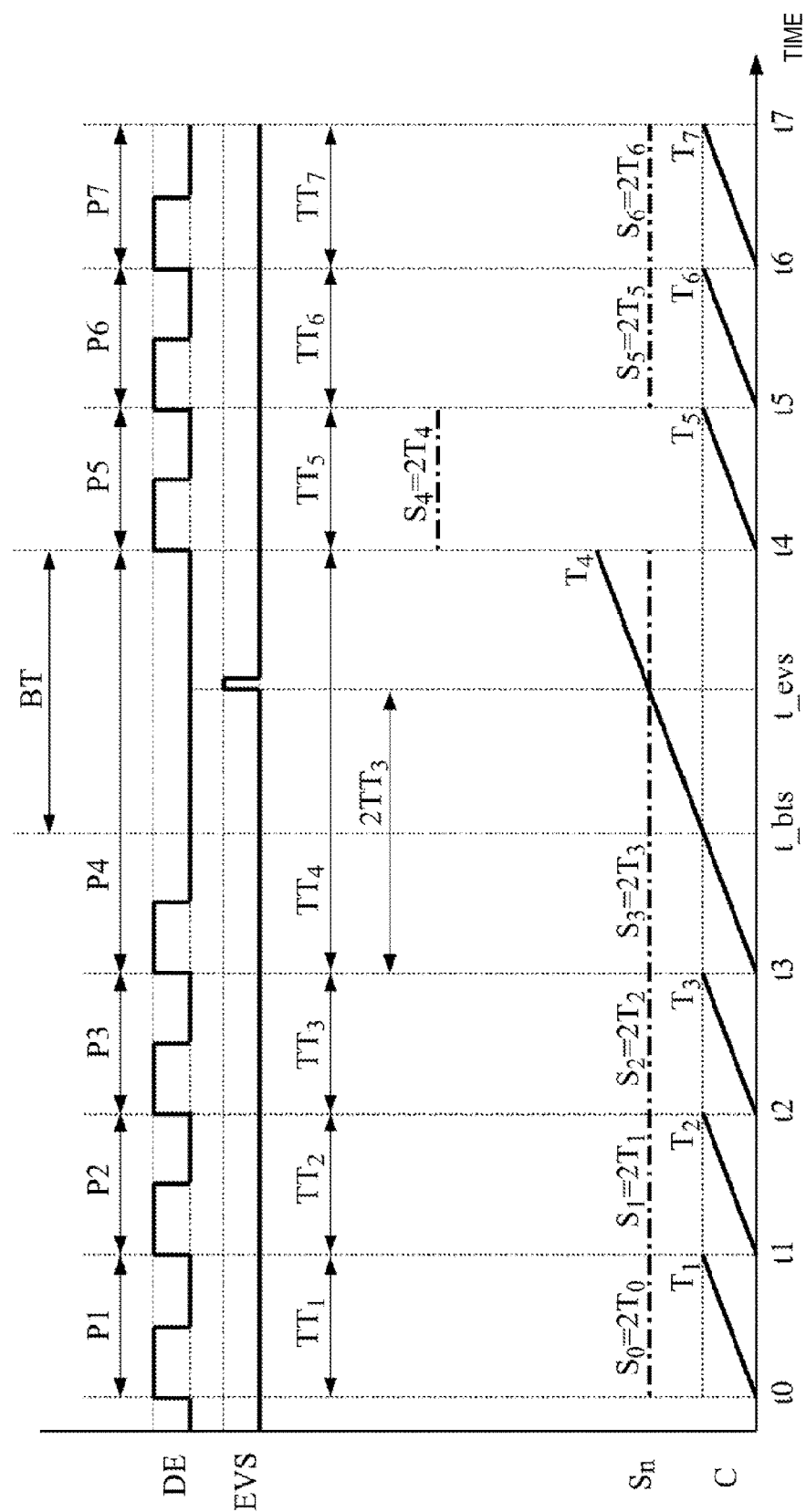
FIG. 3 is a time chart for a case where an estimated vertical synchronizing signal EVS is generated in the image signal processing apparatus 1000.

FIG. 3 is a time chart for a case where the estimated vertical synchronizing signal EVS is generated in the image signal processing apparatus 1000. Specifically, in FIG. 3, the data enable signal DE, the estimated vertical synchronizing signal EVS, the counter value C which is outputted from the counting module 212, and the threshold $S_n$ which is outputted from the threshold generator 213 are illustrated by having their time axes in agreement with each other.

(Between Time Points t0 and t1):

At a time point t0, the edge detecting module 211 detects the rising edge of the data enable signal DE and outputs the edge detection signal Edet indicating the detection result to the counting module 212.

When the counting module 212 confirms, based on the edge detection signal Edet, that the rising edge of the data enable signal DE is detected, it resets the counter value C to "0." Then, in the period between the time points t0 and t1, the counting is performed by incrementing the counter value C by "+1" every time the clock signal CLK is inputted (e.g., every time the rising edge of the clock signal is detected). The counting module 212 repeats the counting until the counter value C is reset. Note that the counter value at the time point t1 is denoted as $T_1$. In other words, the counter value C outputted from the counting module 212 at the time point t1 is $C=T_1$.

The counter value C is outputted from the counting module 212 to the multiplier 2132 of the threshold generator 213.

At the multiplier 2132, the coefficient k outputted from the register 2131 is multiplied by the counter value C. Then, the multiplication result (C×k) is outputted to the memory 2133. Note that the following description of this embodiment is given with k=2.

At the memory 2133, when the edge detection signal Edet outputted from the edge detecting module 211 is active, the output from the multiplier 2132 (multiplication result (C×k)) is stored. For example, since the edge detecting module 211 detects the rising edge of the data enable signal DE at the time point t1, the edge detection signal Edet outputted from the edge detecting module 211 to the memory 2133 is active.

Therefore, the memory 2133 stores the multiplication result ($2 \times C = 2 \times T_1$) between the counter value C ($=T_1$) at the time point t1 and the coefficient k ($=2$).

In the period between the time points t0 and t1, the memory 2133 outputs, as $S_n$ ($=S_0$), the result outputted from the multiplier 2132 and stored previously when the edge detection signal Edet was active, to the comparing module 214. Specifically, the memory 2133 outputs, as $S_n$ ($=S_0$), the result outputted from the multiplier 2132 at the time point t0 (here, this result is $2 \times T_0$), to the comparing module 214.

In the period between the time points t0 and t1, the comparing module 214 compares the output $S_0$ ($=2 \times T_0$) from the memory 2133 with the output C from the counting module 212.

As illustrated in FIG. 3, in the period between the time points t0 and t1, $$C < S_0 (= 2 \times T_0).$$

Therefore, in the period between the time points t0 and t1, the comparing module 214 outputs, to the EVS acquiring module 215, a value indicating that the output C from the counting module 212 is smaller than $S_0$ ($=2 \times T_0$) (in this embodiment, this outputted value is "0").

In the period between the time points t0 and t1, since the value outputted from the comparing module 214 is "0," the EVS acquiring module 215 outputs, to the image signal processor 22, the estimated vertical synchronizing signal EVS by having its signal value as a value indicating a non-active state (in this embodiment, this value is "0").

(Between Time Points t1 and t2):

At the time point t1, the edge detecting module 211 detects the rising edge of the data enable signal DE and outputs the edge detection signal Edet indicating the detection result to the counting module 212.

Based on the edge detection signal Edet, the counting module 212 resets the counter value C to "0" at the time point t1. Then, in the period between the time points t1 and t2, the counting is performed by incrementing the counter value by "+1" every time the clock signal CLK is inputted (e.g., every time the rising edge of the clock signal is detected). The counting module 212 repeats the counting until the counter value C is reset. Note that the counter value at the time point t2 is denoted as $T_2$. In other words, the counter value C outputted from the counting module 212 at the time point t2 is $$C = T_2.$$

The counter value C ($=T_2$) is outputted from the counting module 212 to the multiplier 2132 of the threshold generator 213.

At the multiplier 2132, the coefficient k outputted from the register 2131 is multiplied by the counter value C. Then, the multiplication result ($C \times k$) is outputted to the memory 2133.

At the memory 2133, when the edge detection signal Edet outputted from the edge detecting module 211 is active, the output from the multiplier 2132 (multiplication result ($C \times k$)) is stored. Since the edge detecting module 211 detects the rising edge of the data enable signal DE at the time point t2, the edge detection signal Edet outputted from the edge detecting module 211 to the memory 2133 at the time point t2 is active. Therefore, the memory 2133 stores the multiplication result ($2 \times C = 2 \times T_2$) between the counter value C ($=T_2$) at the time point t2 and the coefficient k ($=2$).

In the period between the time points t1 and t2, the memory 2133 outputs, as $S_1$ ($=2 \times T_1$), the result outputted from the multiplier 2132 and stored previously (at the time point t1) when the edge detection signal Edet is active, to the comparing module 214. Specifically, the memory 2133 outputs, as $S_1$, the result ($=2 \times T_1$) outputted from the multiplier 2132 at the time point t1, to the comparing module 214.

In the period between the time points t1 and t2, the comparing module 214 compares the output $S_1$ ($=2 \times T_1$) from the memory 2133 with the output C from the counting module 212.

As illustrated in FIG. 3, in the period between the time points t1 and t2, $$C < S_1 (= 2 \times T_1).$$

Therefore, in the period between the time points t1 and t2, the comparing module 214 outputs, to the EVS acquiring module 215, the value "0" indicating that the output C from the counting module 212 is smaller than $S_1$ ($=2 \times T_1$).

In the period between the time points t1 and t2, since the value outputted from the comparing module 214 is "0," the EVS acquiring module 215 outputs, to the image signal processor 22, the estimated vertical synchronizing signal EVS by having its signal value as the value "0" indicating the non-active state.

(Between Time Points t2 and t3):

Between time points t2 and t3, similar processing to between the time points t1 and t2 is performed.

(Between Time Points t3 and t4):

Between time points t3 and t4, as illustrated in FIG. 3, a period between time points t_bts and t4 is a blanking period of the data enable signal DE (the period BT illustrated in FIG. 3). Note that in FIG. 3, the blanking period of the data enable signal DE is illustrated as a period corresponding to approximately 2H (the image signals of two lines) for the sake of convenience of description; however, the blanking period of the data enable signal DE may be a longer period. Further, the blanking period of the data enable signal DE may be a period corresponding to a vertical blanking period of, for example, an NTSC-type television signal, etc.

At the time point t3, the edge detecting module 211 detects the rising edge of the data enable signal DE and outputs the edge detection signal Edet indicating the detection result to the counting module 212.

Based on the edge detection signal Edet, the counting module 212 resets the counter value C to "0" at the time point t3. Then, in the period between the time points t3 and t4, the counting is performed by incrementing the counter value by "+1" every time the clock signal CLK is inputted (e.g., every time the rising edge of the clock signal is detected).

In the period between the time points t3 and t4, the memory 2133 outputs, as $S_3$ ($=2 \times T_3$), the result outputted from the multiplier 2132 and stored at the time point t3 when the edge detection signal Edet is active, to the comparing module 214. Specifically, the memory 2133 outputs, as $S_3$, the result ($=2 \times T_3$) outputted from the multiplier 2132 at the time point t3, to the comparing module 214.

In the period between the time points t3 and t4, the comparing module 214 compares the output $S_3$ ($=2 \times T_3$) from the memory 2133 with the output C from the counting module 212.

As illustrated in FIG. 3, in the period between the time points t3 and t_evs (the period excluding the time point t_evs), $$C < S_3 (= 2 \times T_3).$$

Therefore, in the period between the time points t3 and t_evs (the period excluding the time point t_evs), the comparing module 214 outputs, to the EVS acquiring module 215, the value "0" indicating that the output C from the counting module 212 is smaller than $S_3$ (=2×$T_3$).

In the period between the time points t3 and t_evs (the period excluding the time point t_evs), since the value outputted from the comparing module 214 is "0," the EVS acquiring module 215 outputs, to the image signal processor 22, the estimated vertical synchronizing signal EVS by having its signal value as the value "0" indicating the non-active state.

At the time point t_evs, $$C=S_3(=2\times T_3).$$

Therefore, at the time point t_evs, the comparing module 214 outputs, to the EVS acquiring module 215, a value "1" indicating that the output C from the counting module 212 is $S_3$ (=2×$T_3$) or larger.

The EVS acquiring module 215 detects that the value outputted from the comparing module 214 is changed from "0" to "1" at the time point t_evs, and the EVS acquiring module 215 outputs, to the image signal processor 22, the estimated vertical synchronizing signal EVS by having its signal value as the value "1" indicating the active state. Note that when the EVS acquiring module 215 detects that the value outputted from the comparing module 214 is changed from "0" to "1," for example, for one clock cycle, the EVS acquiring module 215 outputs, to the image signal processor 22, the estimated vertical synchronizing signal EVS by having its signal value as the value "1" indicating the active state.

As illustrated in FIG. 3, the timing at which the signal value of the estimated vertical synchronizing signal EVS becomes active is the time point t_evs, which is a time point after twice the period between the time points t2 and t3 has elapsed from the time point t3 at which the rising edge of the data enable signal DE is detected. In other words, the timing at which the signal value of the estimated vertical synchronizing signal EVS becomes active is a time point after a period of time which corresponds to a value obtained by multiplying twice a value of the clock count number $T_3$ between the time points t2 and t3 by an average clock cycle of the clock signal CLK between the time points t2 and t3 is elapsed from the time point t3. This is illustrated as "2$TT_3$" (a period of time corresponding to the clock count number 2$T_3$ of the clock signal CLK) in the period between the time points t3 and t_evs in FIG. 3. Note that "2$TT_3$" is, as described above, a period of time which corresponds to a value obtained by multiplying twice (k-times) the value of the clock count number $T_3$ between the time points t2 and t3 by the average clock cycle of the clock signal CLK between the time points t2 and t3, from the time point t3. Moreover, "$TT_2$," etc., in FIG. 3 are also similar to above. For example, the period indicated by "$TT_2$" in FIG. 3 is a period of time which corresponds to a value obtained by multiplying the clock count number $T_2$ between the time points t1 and t2 by an average clock cycle of the clock signal CLK between the time points t1 and t2.

In a period from the time point t_evs to the time point t4 (the period excluding the time point t_evs), the comparing module 214 compares the output $S_3$ (=2×$T_3$) from the memory 2133 with the output C from the counting module 212.

As illustrated in FIG. 3, in the period from the time point t_evs to the time point t4 (the period excluding the time point t_evs), $$C>S_3(=2\times T_3).$$

Therefore, in the period from the time point t_evs to the time point t4 (the period excluding the time point t_evs), the comparing module 214 outputs, to the EVS acquiring module 215, the value "1" indicating that the output C from the counting module 212 is larger than $S_3$ (=2×$T_3$).

In the period from the time point t_evs to the time point t4 (the period excluding the time point t_evs), since the value outputted from the comparing module 214 is "1" (the output value from the comparing module 214 is not changed), the EVS acquiring module 215 outputs, to the image signal processor 22, the estimated vertical synchronizing signal EVS by having its signal value as the value "0" indicating the non-active state.

(Between Time Points t4 and t7):

Between time points t4 and t7, similar processing to between the time points t1 and t2 is performed.

Note that between time points t4 and t5, as can be understood from FIG. 3, the threshold $S_4$ is set to be the same as 2$T_4$, and since $T_4$ is a large value, the threshold $S_4$ is also set to be a large value. As can be understood from FIG. 3, between time points t4 and t5, the counter value C does not exceed the threshold $S_4$.

As described above, in the period between the time points t3 and t4, the signal value of the estimated vertical synchronizing signal EVS becomes active only at the time point t_evs at which the output value from the comparing module 214 is changed. In other words, the estimated vertical synchronizing signal EVS becomes active at the time point after the period of time which corresponds to the value obtained by multiplying twice the value of the clock count number $T_3$ between the time points t2 and t3 by the average clock cycle of the clock signal CLK between the time points t2 and t3 is elapsed from the time point t3 at which the rising edge of the data enable signal DE is detected. Therefore, with the image signal processing apparatus 1000, since such processing as described above is performed by the estimated vertical synchronizing signal generator 21, even without a vertical synchronizing signal, the estimated vertical synchronizing signal can be generated (the signal value of the estimated vertical synchronizing signal EVS can be changed to be active) at a time point (time point t_evs) close to a starting time point of the blanking period of the data enable signal DE (the period corresponding to the vertical blanking period).

As described above, at the estimated vertical synchronizing signal generator 21 of the image processing unit 2, the estimated vertical synchronizing signal EVS is generated based on the clock signal CLK and the data enable signal DE which are outputted from the reception signal processor 12 and received via the interface 20. Further, the generated estimated vertical synchronizing signal EVS is outputted to the image signal processor 22.

At the image signal processor 22, by using the estimated vertical synchronizing signal EVS generated by the estimated vertical synchronizing signal generator 21, for example, the image signal processing in the vertical direction is performed on the image signal Din. For example, in the case where the image signal processor 22 performs the image signal processing in the vertical direction, since the time point at which the signal value of the estimated vertical synchronizing signal EVS becomes active is the time point (the time point t_evs in the case of FIG. 3) close to the starting time point of the blanking period of the data enable signal DE (the period corresponding to the vertical blanking period), a required volume of the line memory can be small. In other words, since the blanking period of the data enable signal DE (the period corresponding to the vertical blanking period) can be swiftly detected with the estimated vertical synchronizing signal EVS, the required number of lines of image signals to be stored until the blanking period of the data enable signal DE is detected can be small. For example, when performing the image processing at a lower end part of the screen, a predetermined number of lines of image signals may need to be stored until the blanking period of the data enable signal (the period corresponding to the vertical blanking period) is detected. Even in such a case, since the blanking period of the data enable signal DE (the period corresponding to the vertical blanking period) can be swiftly detected with the estimated vertical synchronizing signal EVS, the required volume of the line memory can be reduced.

Further, at the image signal processor 22, the blanking period of the data enable signal DE (the period corresponding to the vertical blanking period) can be detected based on the time point at which the estimated vertical synchronizing signal EVS becomes active, and by counting the rising edge of the data enable signal DE based on the detected time point, the number of the line to which the image signal as a processing target belongs among the lines in one frame can be grasped. Thus, at the image signal processor 22, even without the vertical synchronizing signal, the image signal processing in the vertical direction can suitably be performed based on the estimated vertical synchronizing signal EVS.

The image signal Dout after the image signal processing is performed by the image signal processor 22 as above, is outputted to the timing controller 31 of the display control unit 3.

At the timing controller 31 of the display control unit 3, the drive signal for displaying the image signal Dout on the display panel is generated based on the clock signal CLK and the data enable signal DE. Further, the generated drive signal is outputted to the display panel driver 32 along with the image signal Dout.

At the display panel driver 32, the display panel is driven so that the image signal Dout is displayed on the display panel, based on the drive signal generated by the timing controller 31. Thus, an image formed based on the image signal Dout is displayed on the display panel.

As described above, in the image signal processing apparatus 1000, the estimated vertical synchronizing signal generator 21 counts the clock number in a period $P_n$ between rising edges of adjacent data enable signals DE (a period between time points $t_{n-1}$ and $t_n$), and sets the value obtained by multiplying the counter value $T_n$ (a counter value at the time point $t_n$) by the coefficient k (e.g., k=2), as the threshold $S_n = k \times T_n$ in a period $P_{n+1}$ between rising edges of next adjacent data enable signals DE (the period between time points $t_n$ and $t_{n+1}$). In the image signal processing apparatus 1000, in the period $P_{n+1}$ (the period between the time points $t_n$ and $t_{n+1}$), the counter value C of the clock number is compared with the threshold $S_n$, and when the magnitude relationship between the counter value C and the threshold $S_n$ is changed (corresponding to the situation at the time point t_evs in FIG. 3), the signal value of the estimated vertical synchronizing signal EVS is changed to be active. Therefore, in the image signal processing apparatus 1000, even without the vertical synchronizing signal, the estimated vertical synchronizing signal can be generated (the signal value of the estimated vertical synchronizing signal EVS can be changed to be active) at the time point (e.g., the time point t_evs in FIG. 3) close to the starting time point of the blanking period of the data enable signal DE (the period corresponding to the vertical blanking period).

Further, in the image signal processing apparatus 1000, for example, by performing the image signal processing in the vertical direction with the estimated vertical synchronizing signal EVS generated as above, suitable image signal processing can be performed while reducing the required volume of the line memory.

Moreover, in the image signal processing apparatus 1000, as described above, the threshold $S_n = k \times T_n$ in the period $P_{n+1}$ (the period between the time points $t_n$ and $t_{n+1}$) is set based on the clock count number $T_n$ in the period $P_n$ between the rising edges of the adjacent data enable signals DE (the period between the time points $t_{n-1}$ and $t_n$), and the generation of the estimated vertical synchronizing signal EVS is performed. Thus, the estimated vertical synchronizing signal EVS can suitably be generated even if the clock frequency is varied, one horizontal period (the period of 1H) is varied, or the number of lines in one frame is varied. Specifically, in the image signal processing apparatus 1000, since the blanking period of the data enable signal DE (the period corresponding to the vertical blanking period) is not detected by using a fixed threshold, the estimated vertical synchronizing signal EVS which suitably detects the blanking period of the data enable signal DE (the period corresponding to the vertical blanking period) can be generated even if the image signal, the clock signal or the like to be inputted is changed. For example, in a liquid crystal television, etc., the clock signal of which spectrum is dispersed may be used to reduce electromagnetic radiation (EMI), and in such a case, the clock number in one horizontal period may vary in every line. Also in such a liquid crystal television, etc., by applying the image signal processing apparatus 1000, the estimated vertical synchronizing signal EVS can suitably be generated even with variation in the clock number.

Further, in a liquid crystal television, etc., there is a case where the number of lines in one frame is slightly varied to synchronize the image signal for input, with the liquid crystal panel (display panel) for output. Also in such a case, by applying the image signal processing apparatus 1000, the estimated vertical synchronizing signal EVS can suitably be generated.

Moreover, in the image signal processing apparatus 1000, since the image signal processing in the vertical direction can be performed by using the estimated vertical synchronizing signal EVS generated as described above, the image processing which originally cannot be performed suitably when one of the vertical synchronizing signal and the estimated vertical synchronizing signal does not exist, can suitably be performed.

An example of a case where an image region of 5×5 pixels centering on an observing pixel on a two-dimensional image is used to filter (filter with a 5×5 filter coefficient) the observing pixel is described with reference to FIG. 4.

Figure 4:
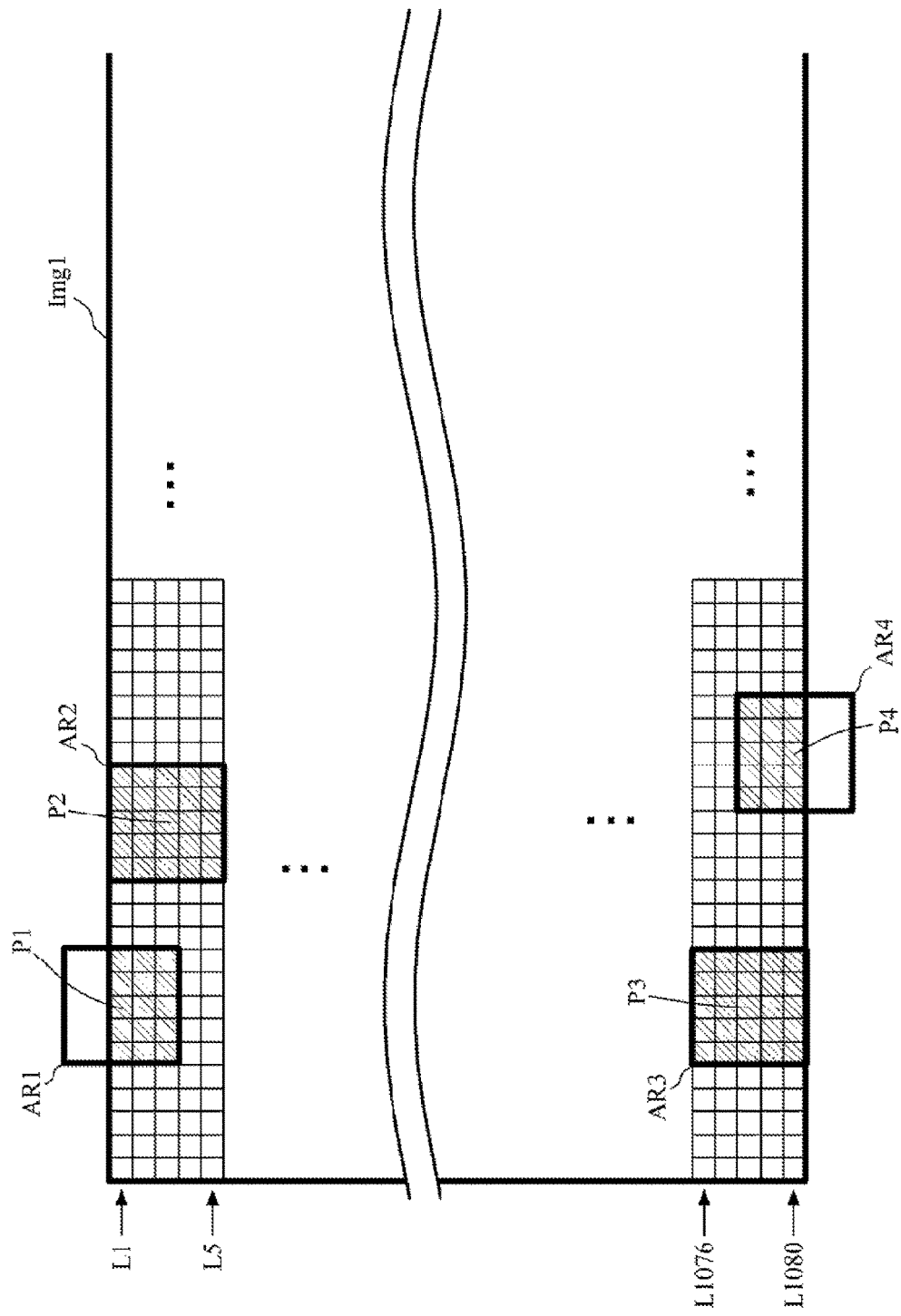
FIG. 4 is a view schematically illustrating an image Img1 formed based on image signals.

FIG. 4 is a view schematically illustrating an image Img1 formed based on the image signal. For the sake of convenience of description, in the image Img1, the number of pixels in the horizontal direction is 1,920 pixels and the number of pixels in the vertical direction is 1,080 pixels.

FIG. 4 illustrates part of an image region from the 1st line L1 to the 5th line L5 of the image Img1 and part of an image region from the 1,076th line L1076 to the 1,080th line L1080 of the image Img1.

In a case where the filtering is performed with the 5×5 filter coefficient by having one of pixels P2 and P3 in FIG. 4 as the processing target (observing pixel), even without the vertical synchronizing signal or the estimated vertical synchronizing signal, since the target pixels (5×5 pixels) which are multiplied by the 5×5 filter coefficient for exist around the observing pixel, the filtering is suitably performed.

On the other hand, in a case where the filtering is performed with the 5×5 filter coefficient for by having one of pixels P1 and P4 in FIG. 4 as the processing target (observing pixel), since the target pixels (5×5 pixels) which are multiplied by the 5×5 filter coefficient for do not exist around part of the area around the observing pixel, the filtering is not suitably performed.

In the case of having the pixel P1 in FIG. 4 as the processing target (observing pixel), without the vertical synchronizing signal or the estimated vertical synchronizing signal, a region AR1 in FIG. 4 becomes the filtering target, and unsuitable filtering is performed. In other words, in the case of filtering on the pixel P1 of the 1st line, without the vertical synchronizing signal or the estimated vertical synchronizing signal, data for two lines on the upper side of the pixel P1 (data for 10 pixels) is filtered by using data for two lines at the lower end portion of the image stored in the line memory for a frame immediately previous to the current frame (data in the 1,079th and 1,080th lines of the image for the immediately previous frame). Thus, without the vertical synchronizing signal or the estimated vertical synchronizing signal, the line of the image signal for which the image signal processing (e.g., filtering) is performed cannot be grasped. As a result, unsuitable image signal processing (e.g., filtering) is performed as described above.

However, in the image signal processing apparatus 1000, even without the vertical synchronizing signal, the estimated vertical synchronizing signal EVS can be generated, and the image signal processor 22 can suitably grasp the line in which the processing target pixel is included, based on the estimated vertical synchronizing signal EVS. In other words, it can be understood that in the image signal processing apparatus 1000, even without the vertical synchronizing signal, the pixel P1 is a pixel included in the 1st line, based on the estimated vertical synchronizing signal EVS. Therefore, in the image signal processing apparatus 1000, for example, in the case of performing the filtering with the 5×5 filter coefficient for by having the pixel P1 as the processing target pixel, it can be determined that the data for the two lines on the upper side of the pixel P1 does not exist, and exceptional processing (e.g., filtering using 15 pixels in the 1st to 3rd lines included in the region AR1) can be performed. As a result, in the image signal processing apparatus 1000, even in a case where the number of data on which the image signal processing (e.g., filtering with the 5×5 filter coefficient for) is performed is insufficient, such as the case of having the pixel P1 as the processing target pixel, unsuitable image signal processing can suitably be prevented from being performed.

In the case of having the pixel P4 in FIG. 4 as the processing target (observing pixel), without the vertical synchronizing signal or the estimated vertical synchronizing signal, a region AR4 in FIG. 4 becomes the filtering target, and unsuitable filtering is performed. In other words, in the case of filtering on the pixel P4 of the 1,080th line, without the vertical synchronizing signal or the estimated vertical synchronizing signal, data for two lines on the lower side of the pixel P4 (data for 10 pixels) is filtered by using data for two lines at the upper end portion of the image for a frame immediately following the current frame (data in the 1st and 2nd lines of the image for the immediately following frame). Thus, without the vertical synchronizing signal or the estimated vertical synchronizing signal, the line of the image signal for which the image signal processing (e.g., filtering) is performed cannot be grasped. As a result, unsuitable image signal processing (e.g., filtering) is performed as described above.

However, in the image signal processing apparatus 1000, even without the vertical synchronizing signal, the estimated vertical synchronizing signal EVS can be generated, and the image signal processor 22 can suitably grasp the line in which the processing target pixel is included, based on the estimated vertical synchronizing signal EVS. In other words, it can be understood that in the image signal processing apparatus 1000, even without the vertical synchronizing signal, the pixel P4 becomes a pixel included in the 1,080th line, based on the estimated vertical synchronizing signal EVS. Therefore, in the image signal processing apparatus 1000, for example, in the case of performing the filtering with the 5×5 filter coefficient for by having the pixel P4 as the processing target pixel, it can be determined that the data for the two lines on the lower side of the pixel P4 does not exist, and exceptional processing (e.g., filtering using 15 pixels in the 1,078th to 1,080th lines included in the region AR4) can be performed. As a result, in the image signal processing apparatus 1000, even in a case where the number of data on which the image signal processing (e.g., filtering with the 5×5 filter coefficient for) is performed is insufficient, such as the case of having the pixel P4 as the processing target pixel, unsuitable image signal processing can suitably be prevented from being performed.

Thus, in the image signal processing apparatus 1000, since the image signal processing in the vertical direction can be performed using the estimated vertical synchronizing signal EVS generated by the estimated vertical synchronizing signal generator 21, the image processing which originally cannot be performed suitably when one of the vertical synchronizing signal and the estimated vertical synchronizing signal does not exist, can suitably be performed.

First Modification

Next, a first modification of the first embodiment is described.

Note that in the following description, characteristic parts of this modification are described, and similar parts to the above embodiment are denoted with the same reference numeral and/or character and detailed description thereof is omitted.

At the edge detecting module 211 of the estimated vertical synchronizing signal generator 21 of the image signal processing apparatus 1000 of the first embodiment, the rising edge of the data enable signal DE is detected; however, at the edge detecting module 211 of the image signal processing apparatus of this modification, a falling edge of the data enable signal DE is detected, and when the falling edge is detected, the edge detection signal Edet is changed to be active. The image signal processing apparatus of this modification is otherwise similar to the image signal processing apparatus 1000 of the first embodiment.

Figure 5:
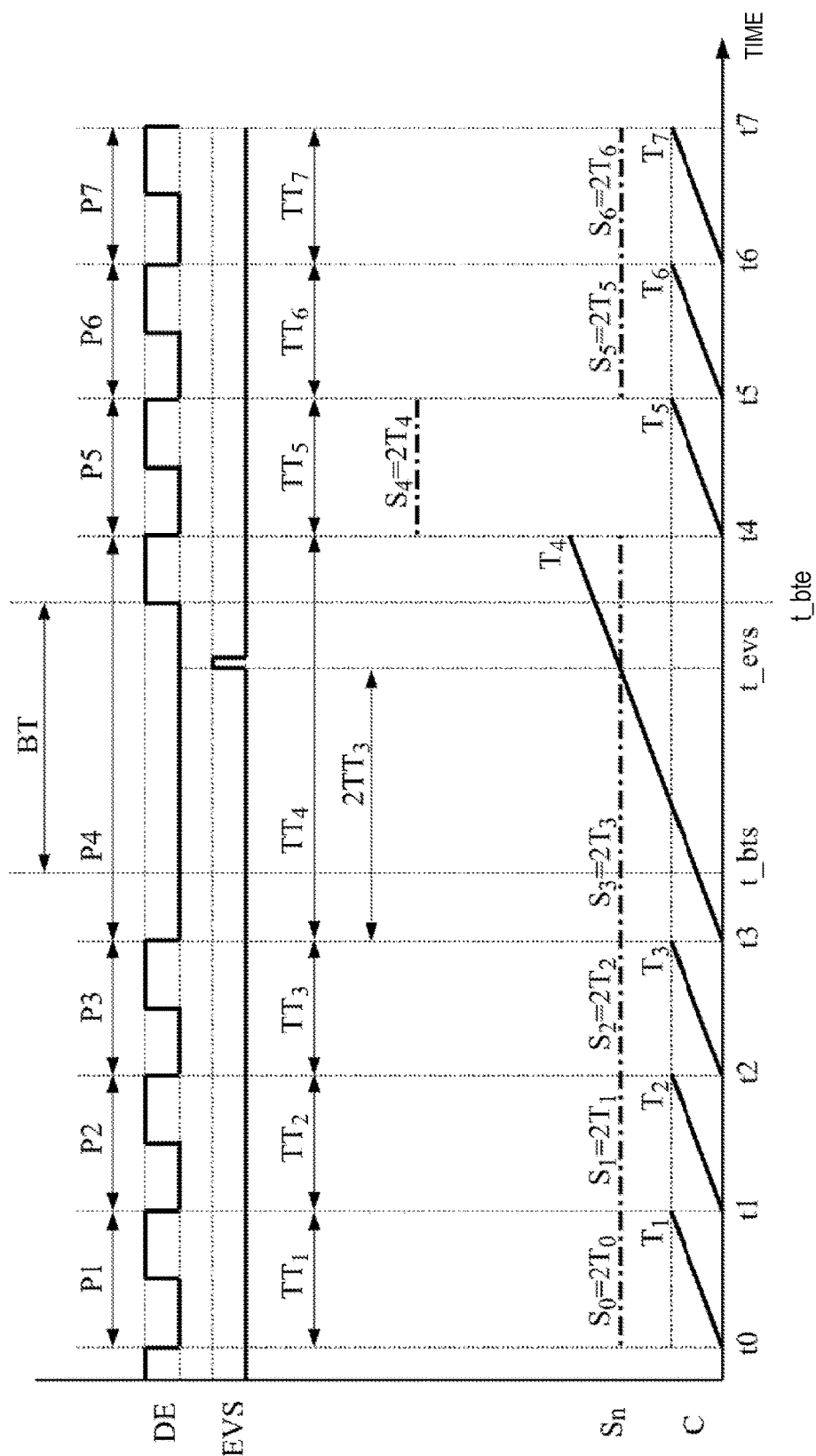
FIG. 5 is a time chart for a case where the estimated vertical synchronizing signal EVS is generated in an image signal processing apparatus of a first modification of the first embodiment.

FIG. 5 is a time chart for a case where an estimated vertical synchronizing signal EVS is generated in the image signal processing apparatus of this modification. Specifically, in FIG. 5, similar to FIG. 3, the data enable signal DE, the estimated vertical synchronizing signal EVS, the counter value C outputted from the counting module 212, and the threshold $S_n$ outputted from the threshold generator 213 are illustrated by having their time axes in agreement with each other.

As can be understood from FIG. 5, in the image signal processing apparatus of this modification, the counter value C which is outputted from the counting module 212 is counted starting at a time point at which the falling edge of the data enable signal DE is detected. Further, as illustrated in FIG. 5, in the image signal processing apparatus of this modification, the timing at which the signal value of the estimated vertical synchronizing signal EVS becomes active is the time point t_evs, which is the time point after twice the period between the time points t2 and t3 is elapsed from the time point t3 at which the falling edge of the data enable signal DE is detected. In other words, the timing at which the signal value of the estimated vertical synchronizing signal EVS becomes active is the time point after the period of time which corresponds to the value obtained by multiplying twice (k-times) the value of the clock count number $T_3$ between the time points t2 and t3 by the average clock cycle of the clock signal CLK between the time points t2 and t3 is elapsed from the time point t3. This is illustrated as "$2TT_3$," (the period of time corresponding to the clock count number $2T_3$ of the clock signal CLK) in the period between the time points t3 and t_evs in FIG. 5.

Thus, also in the image signal processing apparatus of this modification, similar to the image signal processing apparatus 1000 of the first embodiment, even without the vertical synchronizing signal, the estimated vertical synchronizing signal can be generated (the signal value of the estimated vertical synchronizing signal EVS can be changed to be active) at the time point (e.g., the time point t_evs in FIG. 5) close to the starting time point of the blanking period of the data enable signal DE (the period corresponding to the vertical blanking period).

Second Modification

Next, a second modification of the first embodiment is described.

Note that in the following description, characteristic parts of this modification are described, and similar parts to the above embodiment are denoted with the same reference numerals and/or characters and detailed description thereof is omitted.

Figure 6:
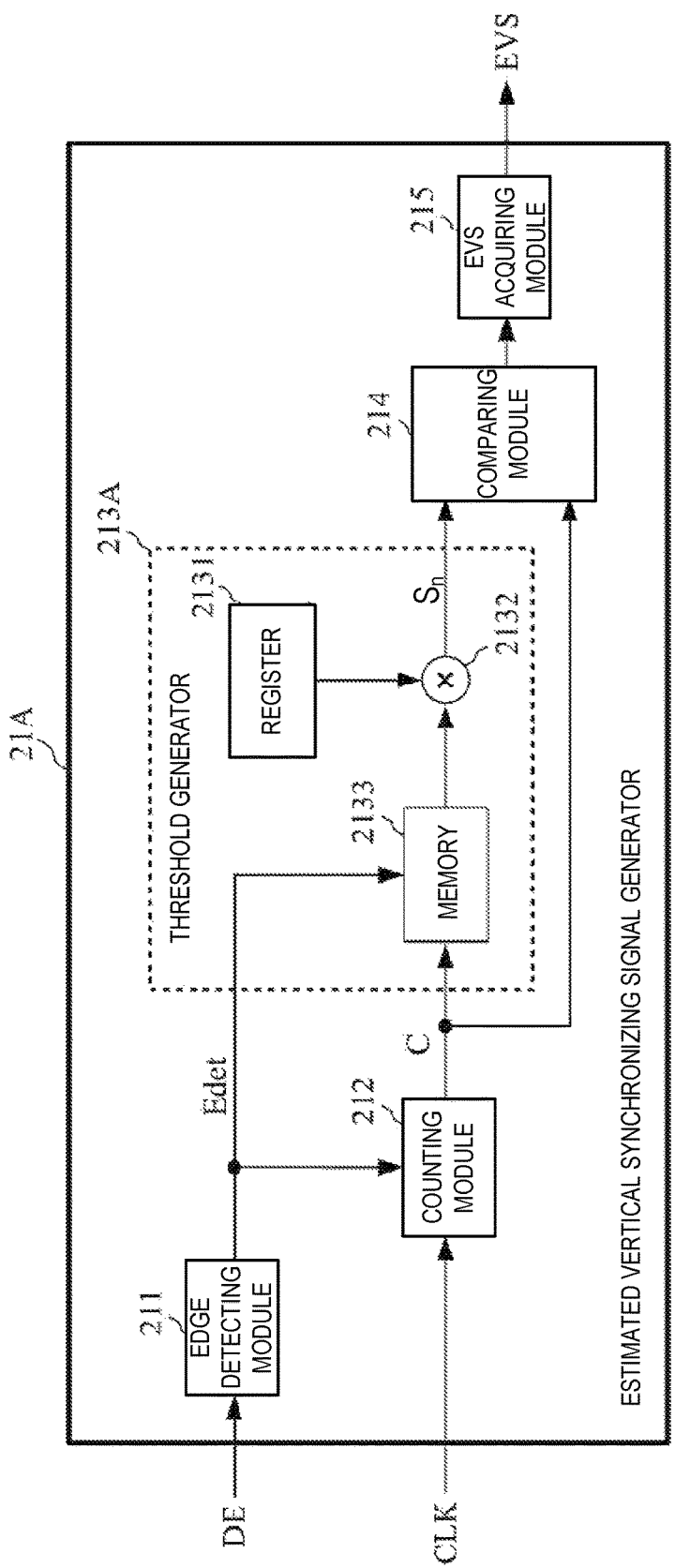
FIG. 6 is a schematic configuration view of an estimated vertical synchronizing signal generator 21A of a second modification of the first embodiment.

A schematic configuration view of an estimated vertical synchronizing signal generator 21A of this modification is illustrated in FIG. 6.

An image signal processing apparatus of this modification has a configuration of the image signal processing apparatus 1000 of the first embodiment, in which the estimated vertical synchronizing signal generator 21 is replaced with the estimated vertical synchronizing signal generator 21A. The image signal processing apparatus of this modification is otherwise similar to the image signal processing apparatus 1000 of the first embodiment.

As illustrated in FIG. 6, the estimated vertical synchronizing signal generator 21A has a configuration of the estimated vertical synchronizing signal generator 21 of the first embodiment, in which the threshold generator 213 is replaced with a threshold generator 213A.

As illustrated in FIG. 6, the threshold generator 213A has a configuration of the threshold generator 213 in which the positions of the register 2131 and the multiplier 2132 are switched with the position of the memory 2133.

The memory 2133 stores the counter value C outputted from the counting module 212, at a timing at which the edge detection signal Edet becomes active. Further, the memory 2133 outputs a previously-stored counter value C ($=T_n$) to the multiplier 2132.

The multiplier 2132 multiplies the coefficient k outputted from the register 2131 by the previously-stored counter value C ($=T_n$) and outputs, as the threshold $S_n$, the multiplication result (k×C) to the comparing module 214.

By processing as above, also in the image signal processing apparatus of this modification, the threshold $S_n$ which amounts to the same value as the first embodiment can be acquired. Therefore, also in the image signal processing apparatus of this modification, similar processing to the first embodiment can be performed.

Note that also at the edge detecting module 211 of this modification, the falling edge may be detected similar to the first modification of the first embodiment.

Third Modification

Next, a third modification of the first embodiment is described.

Note that in the following description, characteristic parts of this modification are described, and similar parts to the above embodiment are denoted with the same reference numerals and/or characters and detailed description thereof is omitted.

Figure 7:
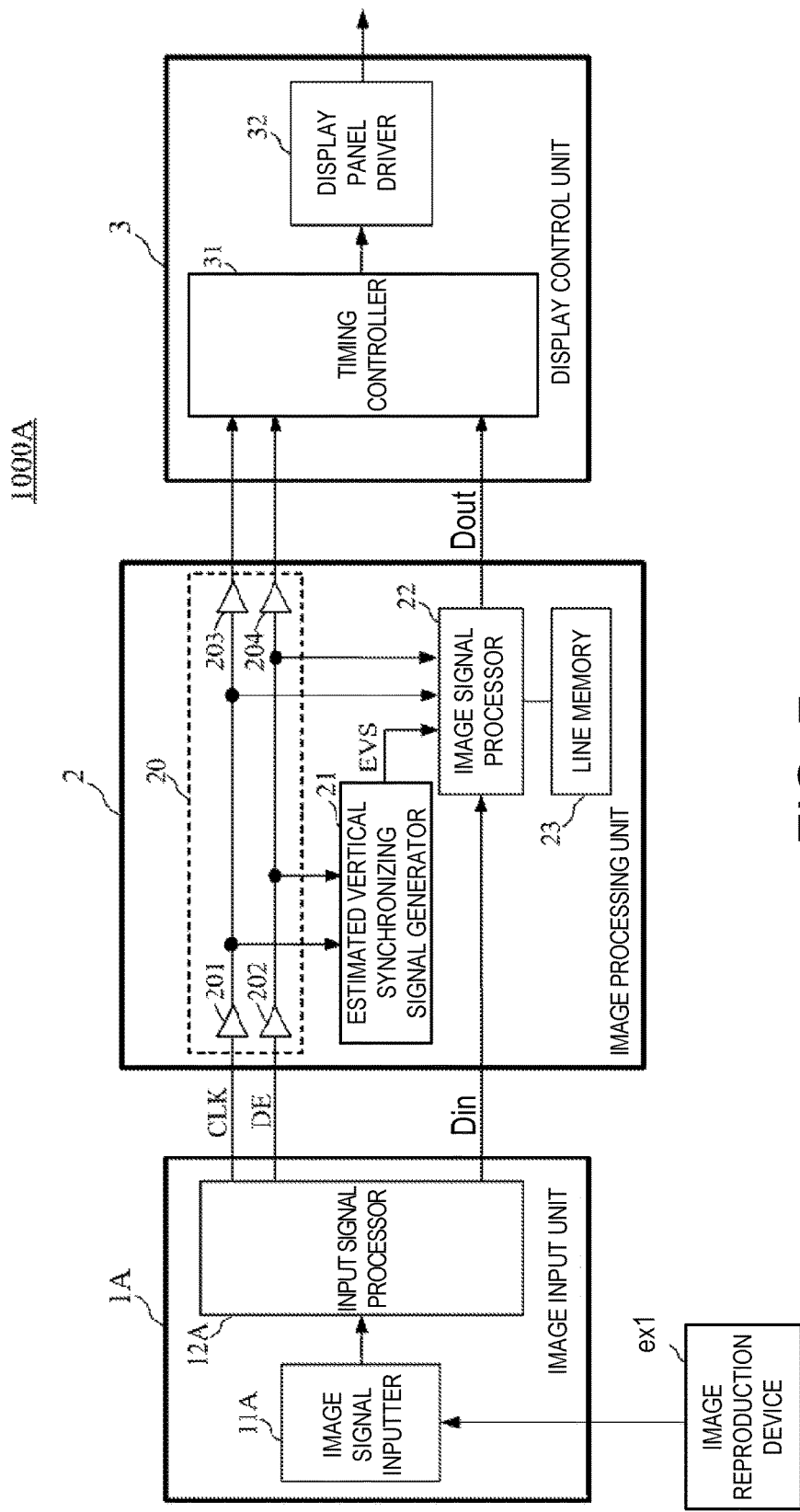
FIG. 7 is a schematic configuration view of an image signal processing apparatus 1000A of a third modification of the first embodiment.

A schematic configuration view of an image signal processing apparatus 1000A of this modification is illustrated in FIG. 7.

As illustrated in FIG. 7, the image signal processing apparatus 1000A has a configuration of the image signal processing apparatus 1000 of the first embodiment, in which the image reception unit 1 is replaced with an image input unit 1A.

As illustrated in FIG. 7, the image input unit 1A includes an image signal inputter 11A and an input signal processor 12A.

An image signal outputted from, for example, an image reproduction device ex1 (e.g., DVD player, BD player, HDD player, etc.) is inputted into the image signal inputter 11A. The image signal outputted from the image reproduction device ex1 is, for example, a signal based on a communication interface standard (e.g., HDMI or IEEE1394). The image signal inputter 11A converts the inputted image signal into a baseband image signal, and outputs the converted image signal to the input signal processor 12A.

The input signal processor 12A has, as its input, the baseband image signal outputted from the image signal inputter 11A. The input signal processor 12A outputs, as the image signal Din, the inputted baseband image signal to the image signal processor 22 of the image processing unit 2.

Further, the input signal processor 12A generates the clock signal CLK and the data enable signal DE for processing the baseband image signal inputted from the image signal inputter 11A, and outputs the generated clock signal CLK and the data enable signal DE to the interface 20 of the image processing unit 2.

The processing at the image processing unit 2 and the display control unit 3 of the image signal processing apparatus 1000A of this modification is similar to the above embodiment (including the modifications).

As described above, in the image signal processing apparatus 1000A of this modification, even in the case of inputting the image signal outputted from the image reproduction device ex1 (e.g., DVD player, BD player, HDD player, etc.), the vertical synchronizing signal obtained by estimation (estimated vertical synchronizing signal) can be generated based on the data enable signal at the time point close to the starting time point of the blanking period of the data enable signal (the period corresponding to the vertical blanking period).

Moreover, similar to the above embodiment (including the modifications), in the image signal processing apparatus 1000A, since the image signal processing in the vertical direction can be performed by using the estimated vertical synchronizing signal EVS generated by the estimated vertical synchronizing signal generator 21, the image processing which originally cannot be performed suitably when one of the vertical synchronizing signal and the estimated vertical synchronizing signal does not exist, can suitably be performed.

Fourth Modification

Next, a fourth modification of the first embodiment is described.

Note that in the following description, characteristic parts of this modification are described, and similar parts to the above embodiment are denoted with the same reference numerals and/or characters and detailed description thereof is omitted.

Figure 8:
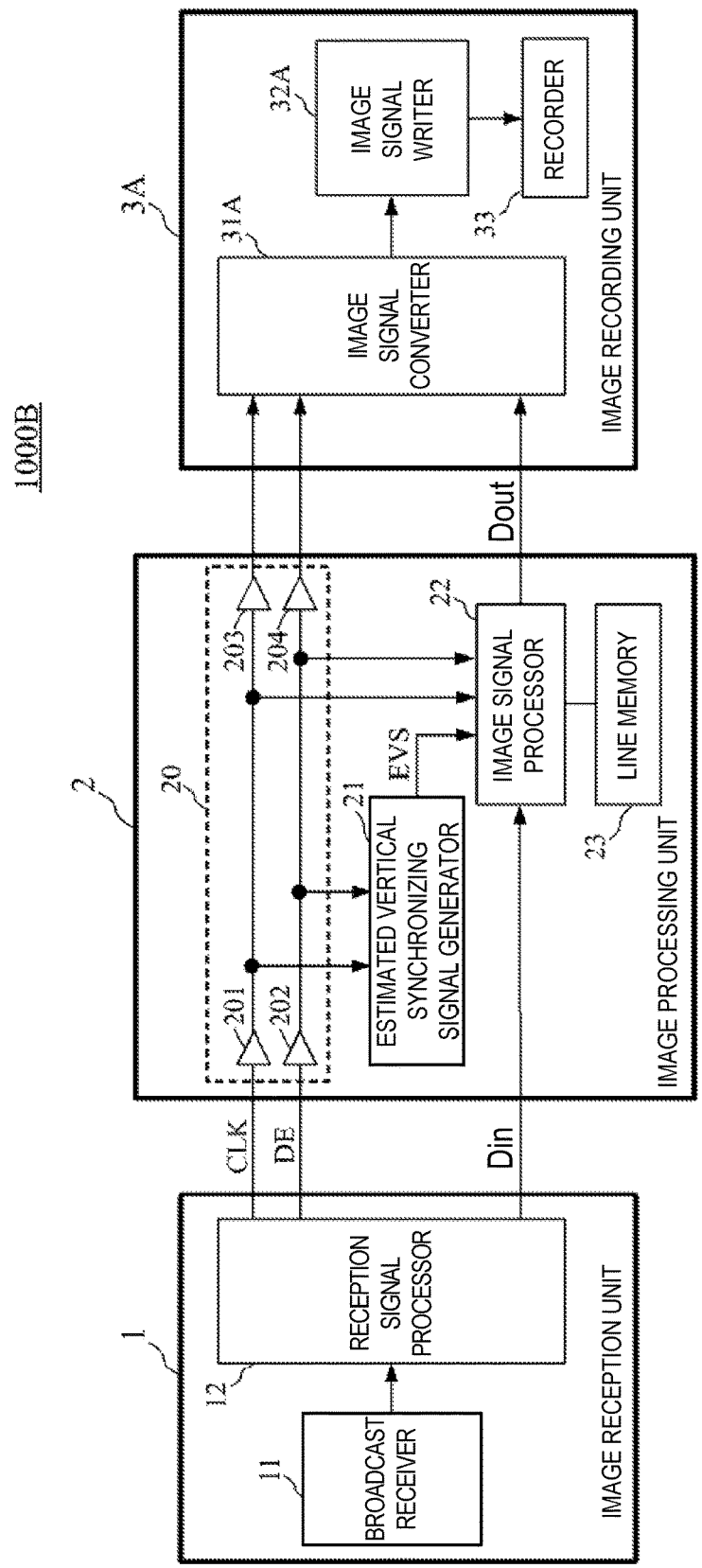
FIG. 8 is a schematic configuration view of an image signal processing apparatus 1000B of a fourth modification of the first embodiment.

A schematic configuration view of an image signal processing apparatus 1000B of this modification is illustrated in FIG. 8.

As illustrated in FIG. 8, the image signal processing apparatus 1000B has a configuration of the image signal processing apparatus 1000 of the first embodiment, in which the display control unit 3 is replaced with an image recording unit 3A.

As illustrated in FIG. 8, the image recording unit 3A includes an image signal converter 31A, an image signal writer 32A, and a recorder 33.

As illustrated in FIG. 8, the clock signal CLK, the data enable signal DE, and the image signal Dout which are outputted from the image processing unit 2 are inputted into the image signal converter 31A. The image signal converter 31A performs conversion (e.g., compression coding) of the image signal Dout into a signal for writing into the recorder 33 (e.g., recording medium) based on the clock signal CLK and the data enable signal DE, so as to generate data to be written. Further, the image signal converter 31A outputs the generated data to be written to the image signal writer 32A.

The data to be written, which is outputted from the image signal converter 31A is inputted into the image signal writer 32A, and the image signal writer 32A writes the inputted data to be written into the recorder 33 (e.g., recording medium).

The recorder 33 is, for example, a recording medium (e.g., hard disk, flash memory, optical magnetic disk, large-capacity DVD, next-generation DVD, semiconductor memory, etc.). At the recorder 33, the data from the image signal writer 32A is written according to the control by the image signal writer 32A. Note that the recorder 33 may be a recording medium detachable from the image recording unit 3A.

The processing at the image reception unit 1 and the image processing unit 2 of the image signal processing apparatus 1000B of this modification is similar to the above embodiment (including the modifications).

As described above, in the image signal processing apparatus 1000B of this modification, similar to the above embodiment (including the modifications), the vertical synchronizing signal obtained by estimation (estimated vertical synchronizing signal) can be generated based on the data enable signal at the time point close to the starting time point of the blanking period of the data enable signal (the period corresponding to the vertical blanking period). Further, in the image signal processing apparatus 1000B of this modification, the image signal Dout processed by using the estimated vertical synchronizing signal can be stored in the recorder 33 by the image recording unit 3A.

Moreover, similar to the above embodiment (including the modifications), in the image signal processing apparatus 1000B, since the image signal processing in the vertical direction can be performed by using the estimated vertical synchronizing signal EVS generated by the estimated vertical synchronizing signal generator 21, the image processing which originally cannot be performed suitably when one of the vertical synchronizing signal and the estimated vertical synchronizing signal does not exist, can suitably be performed.

Other Embodiments

In the above embodiment (including the modifications), the coefficient k which is set at the register 2131 is described as a fixed value; however, it is not limited to this, and the coefficient k which is set at the register 2131 may be a changeable value. Further, the value of k may be a value other than "2" which is exemplarily described above. By adjusting the value of k, the timing at which the estimated vertical synchronizing signal EVS becomes active can be adjusted. Moreover, the register 2131 which can change the value of the coefficient k may be omitted so that the coefficient k is a fixed value, such as "2."

Further, the image signal processing apparatus may be configured by realizing the reception signal processor 12 of the image reception unit 1 with a system large scale integrated circuit (LSI), realizing the timing controller 31 of the display control unit 3 with a different LSI (or integrated circuit (IC)), and interposing therebetween the image processing unit 2 as another LSI (e.g., as illustrated in FIG. 1). In this manner, for example, in a device where the reception signal processor 12 of the image reception unit 1 is directly coupled to the timing controller 31, the image processing unit 2 can be added, and the image signal acquired by performing, with the estimated vertical synchronizing signal EVS, the image processing on the output image signal of the reception signal processor 12 can be inputted into the timing controller 31. Thus, even in the device where the reception signal processor 12 of the image reception unit 1 is directly coupled to the timing controller 31, by interposing the image processing unit 2 therebetween, an extended function (e.g., image signal processing in the vertical direction with the estimated vertical synchronizing signal EVS) can easily be realized.

Furthermore, the configuration using the image processing unit 2 by interposing it between the circuit for outputting the clock signal CLK, the data enable signal DE, and the image signal Din and the circuit for receiving the clock signal CLK, the data enable signal DE, and the image signal Dout, various configurations other than that described in the above embodiment (including the modifications) may be provided. The present invention is applicable to any of them.

Also, in the above embodiment (including the modifications), the configuration in which the clock signal CLK and the data enable signal DE are supplied from the image reception unit 1 to the timing controller 31 via the image processing unit 2 is described. Although delay processing, etc., are not explicitly described in the above embodiment (including the modifications), the data enable signal DE may be delayed by, for example, the image processing unit 2 as needed and supplied (outputted) to the timing controller 31.

Moreover, the clock signal CLK and the data enable signal DE may be directly supplied (outputted) from the reception signal processor 12 to the image processing unit 2 and the timing controller 31. Furthermore, the clock signal CLK and the data enable signal DE may be generated by any functional part other than the reception signal processor 12.

The image signal processing apparatus may be realized by combining part or all of the components of the above embodiment (including the modifications). Further, the estimated vertical synchronizing signal generator 21 may solely be configured as a single device.

Moreover, a display device may be realized by adding a display panel to the image signal processing apparatus of the above embodiment (including the modifications).

Also, the image signal processing apparatus of the above embodiment may partially or entirely be realized as an integrated circuit (e.g., LSI, system LSI, etc.).

The processing of the respective function blocks of the above embodiment may partially or entirely be realized by a program. Further, the processing of the respective function blocks of the above embodiment may partially or entirely be performed by a central processing unit (CPU) of a computer. Moreover, the program for performing the respective processing may be stored in a memory, such as a hard disk or a ROM, so that the central processing unit (CPU) reads the program from the ROM or a RAM and executes it.

Further, each processing of the above embodiment may be realized by hardware, or software (including a case of realizing with an OS (Operating System), middleware, or a predetermined library). Furthermore, each processing of the above embodiment may be realized by mixed processing of software and hardware.

Note that in the case of realizing the image signal processing apparatus according to the above embodiment by hardware, it is needless to say that timing adjustment is required to perform each processing. In the above embodiment (including the modifications), the details of the timing adjustments for various signals which are generated in an actual hardware design are omitted for the sake of convenience of description. Further, control signals for the timing adjustment (e.g., vertical synchronizing signal, horizontal synchronizing signal, various enable signals, etc.) are not illustrated. Moreover, a delayer, etc., for performing the timing adjustment are also not illustrated.

Further, an input buffer and an output buffer may be provided to the respective functional components of the above embodiment (including the modifications).

Moreover, a performing order of the processing in the method described in the above embodiment is not necessarily limited to the description of the above embodiment, and may be changed within a range not departing from the scope of the invention.

A computer program for causing a computer to implement the method described above, and a computer-readable recording medium storing the program are within the range of the present invention. Here, examples of the computer-readable recording medium include a flexible disk, a hard disk, a CD-ROM, an MO, a DVD, a large-capacity DVD, a next-generation DVD, and a semiconductor memory.

The computer program is not limited to being stored in the recording medium, and may be transmitted via a network, etc., represented by an electric communication line, a wireless/wired communication line, and the Internet.

Note that the specific configuration of the present invention is not limited to the embodiment described above, and may be modified and revised variously within a range not departing from the scope of the invention.

[Note]

Note that the present invention can be expressed as follows.

An image processing device with a first configuration is an image processing device for receiving at least a clock signal, a data enable signal, and an image signal, outputting at least the clock signal, the data enable signal, and a processed image signal, and including an interface module, an estimated vertical synchronizing signal generator, and an image signal processor.

The interface module receives the clock signal and the data enable signal, and outputs the clock signal and the data enable signal.

The estimated vertical synchronizing signal generator generates an estimated vertical synchronizing signal based on the clock signal and the data enable signal.

The image signal processor receives the image signal, generates the processed image signal by performing, on the image signal, predetermined processing using the estimated vertical synchronizing signal generated by the estimated vertical synchronizing signal generator, and outputs the generated processed image signal.

In the image processing device, the estimated vertical synchronizing signal generator generates the estimated vertical synchronizing signal based on the clock signal and the data enable signal, and the image signal processor performs, on the image signal, the predetermined processing using the estimated vertical synchronizing signal generated by the estimated vertical synchronizing signal generator. Therefore, in the image processing device, even without a vertical synchronizing signal, the image signal processing can suitably be performed using the estimated vertical synchronizing signal.

An image processing device with a second configuration is an apparatus with the first configuration, and the estimated vertical synchronizing signal generator includes an edge detecting submodule, a counting submodule, a threshold generating submodule, a comparing submodule, and an estimated vertical synchronizing signal acquiring submodule.

The edge detecting submodule detects one of a rising edge and a falling edge of the data enable signal.

The counting submodule counts a clock number of the clock signal in a period of time from a time point $t_n$ at which the one of the rising and falling edges is detected by the edge detecting submodule, to a time point $t_{n+1}$ at which the one of the rising and falling edges is next detected by the edge detecting submodule.

The threshold generating submodule sets, as a threshold $S_n$, a value obtained by multiplying a counter value $T_n$ of the clock number by a coefficient k ($T_n \times k$), the counter value $T_n$ obtained by the counting of the counting submodule in a period from a time point $t_{n-1}$ to the time point $t_n$, the time point $t_{n-1}$ being a time point at which the one of the rising and falling edges is detected by the edge detecting submodule and which is immediately previous the time point $t_n$.

The comparing submodule compares the threshold $S_n$ with the counter value of the clock number counted by the counting submodule.

When the comparing submodule detects that a magnitude relationship between the threshold $S_n$ and the counter value of the clock number counted by the counting submodule is changed, the estimated vertical synchronizing signal acquiring submodule generates the estimated vertical synchronizing signal that changes a signal value thereof to be active.

In this image processing device, the clock number in a period between the edges (one of between the rising edges and between the falling edges) of the adjacent data enable signals DE (the period between the time points $t_{n-1}$ and $t_n$) is counted, and the value obtained by multiplying the counter value by the coefficient k is set as the threshold $S_n$ of a period between edges of the next adjacent data enable signals DE (the period between the time points $t_n$ and $t_{n+1}$). In this image processing device, in the period between the time points $t_n$ and $t_{n+1}$, the counter value of the clock number is compared with the threshold $S_n$, and when the magnitude relationship between the counter value and the threshold $S_n$ is changed, the signal value of the estimated vertical synchronizing signal EVS is changed to be active. Therefore, in this image processing device, even without the vertical synchronizing signal, the estimated vertical synchronizing signal can be generated (the signal value of the estimated vertical synchronizing signal EVS can be changed to be active) at a time point close to a starting time point of a blanking period of the data enable signal (the period corresponding to a vertical blanking period).

In other words, in this image processing device, even without the vertical synchronizing signal, based on the data enable signal, the vertical synchronizing signal obtained by estimation (estimated vertical synchronizing signal) can be generated at the time point close to the starting time point of the blanking period of the data enable signal (the period corresponding to the vertical blanking period).

Note that the case where "a magnitude relationship between the threshold $S_n$ and the counter value of the clock number counted by the counting submodule is changed" is, for example, a case where state (1) of $S_n$>counter value (or a state of $S_n \geq$counter value) is changed to state (2) of $S_n \leq$counter value (or a state of Sn<counter value). Therefore, the signal value of the estimated vertical synchronizing signal becomes active when the change from state (1) to state (2) is detected.

Further, in the case (1) of detecting the rising edge, the edge detecting submodule only detects the rising edge, whereas in the case (2) of detecting the falling edge, the edge detecting submodule only detects the falling edge. In other words, the edge detecting submodule does not detect both of the rising and falling edges. Note that the edge detecting submodule may detect a predetermined position of the data enable signal shifted from the rising edge (or the falling edge) by a predetermined period of time.

An image processing device with a third configuration is an apparatus with the second configuration, and the threshold generating submodule sets the threshold $S_n$ by having the coefficient as "2."

Thus, in the image processing device, for example, when a time point at which the edge (e.g., the rising edge) is detected the last time before the blanking period of the data enable signal is started is a time point t3, and a time point at which the edge (e.g., the rising edge) is detected immediately previous to the time point t3 is a time point t2, the signal value of the estimated vertical synchronizing signal is changed to be active at a time point after twice the period between the time points t2 and t3 is elapsed from the time point t3 at which the edge (e.g., the rising edge) of the data enable signal is detected. In other words, in the image processing device, the timing at which the signal value of the estimated vertical synchronizing signal becomes active is a time point after a period of time which corresponds to a value obtained by multiplying twice (k-times) the value of the clock count number between the time points t2 and t3 by an average clock cycle of the clock signal between the time points t2 and t3 is elapsed from the time point t3. Therefore, in this image processing device, the vertical synchronizing signal obtained by estimation (estimated vertical synchronizing signal) can be generated at the time point close to the starting time point of the blanking period of the data enable signal (the period corresponding to the vertical blanking period).

An image processing device with a fourth configuration is an apparatus with any one of the first to third configurations, and the image signal processor performs image signal processing at least in a vertical direction.

Thus, in the image processing device, even without the vertical synchronizing signal, image signal processing including the image signal processing at least in the vertical direction can suitably be performed by using the estimated vertical synchronizing signal.

INDUSTRIAL APPLICABILITY

The present invention can generate, based on a data enable signal, a vertical synchronizing signal obtained by estimation (estimated vertical synchronizing signal) at a time point close to a starting time point of a blanking period of the data enable signal (a period corresponding to a vertical blanking period), even without a vertical synchronizing signal. Therefore, the present invention is useful and implementable in image-related industrial fields.

LIST OF REFERENCE CHARACTERS 1000, 1000A, 1000B Image Signal Processing Apparatus
1 Image Reception Unit
2 Image Processing Unit (Image Processing Device)
21, 21A Estimated Vertical Synchronizing Signal Generator
211 Edge Detecting Module
212 Counting Module
213, 213A Threshold Generator
214 Comparing Module
215 EVS Acquiring Module (Estimated Vertical Synchronizing Signal Acquiring Module)
22 Image Signal Processor
3 Display Control Unit

What is claimed is:

1. An image processing device for receiving, from an output circuit for outputting a clock signal, a data enable signal, and an image signal, at least the clock signal, the data enable signal, and the image signal and outputting, to a receiving circuit for receiving the clock signal, the data enable signal, and the image signal, at least the clock signal, the data enable signal, and a processed image signal, the image processing device including:

an interface module, executed on a processor, for receiving the clock signal and the data enable signal from the output circuit, and outputting the clock signal and the data enable signal to the receiving circuit;

an estimated vertical synchronizing signal generator, executed on the processor, for generating an estimated vertical synchronizing signal based on the clock signal and the data enable signal; and an image signal processor for receiving the image signal from the output circuit, generating the processed image signal by performing, on the image signal, predetermined processing that uses the estimated vertical synchronizing signal generated by the estimated vertical synchronizing signal generator, and outputting the processed image signal to the receiving circuit, a controller of the receiving circuit receiving the processed image signal from the image signal processor and receiving the clock signal and the data enable signal from the interface module.

2. The image processing device of claim 1, wherein the estimated vertical synchronizing signal generator includes:
an edge detecting submodule, executed on the processor, for detecting one of a rising edge and a falling edge of the data enable signal;
a counting submodule, executed on the processor, for counting a clock number of the clock signal in a period of time from a time point $t_n$ at which the one of the rising and falling edges is detected by the edge detecting submodule, to a time point $t_{n+1}$ at which the one of the rising and falling edges is next detected by the edge detecting submodule;
a threshold generating submodule, executed on the processor, for setting, as a threshold $S_n$, a value obtained by multiplying a counter value $T_n$ of the clock number by a coefficient k ($T_n \times k$), the counter value $T_n$ obtained by the counting of the counting submodule in a period from a time point $t_{n-1}$ to the time point $t_n$, the time point $t_{n-1}$ being a time point at which the one of the rising and falling edges is detected by the edge detecting submodule and which is immediately previous to the time point $t_n$;
a comparing submodule, executed on the processor, for comparing the threshold $S_n$ with the counter value of the clock number counted by the counting submodule; and
an estimated vertical synchronizing signal acquiring submodule, executed on the processor, for generating the estimated vertical synchronizing signal that changes a signal value thereof to be active, when the comparing submodule detects that a magnitude relationship between the threshold $S_n$ and the counter value of the clock number counted by the counting submodule is changed.

3. The image processing device of claim 2, wherein the threshold generating submodule sets the threshold $S_n$ by having the coefficient as "2".

4. The image processing device of claim 1, wherein the image signal processor performs image signal processing at least in a vertical direction.

5. An image processing device for receiving, from an output circuit for outputting a clock signal, a data enable signal, and an image signal, at least the clock signal, the data enable signal, and the image signal and outputting, to a receiving circuit for receiving the clock signal, the data enable signal, and the image signal, at least the clock signal, the data enable signal, and a processed image signal, the image processing device including:
an interface module, executed on circuitry, for receiving the clock signal and the data enable signal from the output circuit, and outputting the clock signal and the data enable signal to the receiving circuit;
an estimated vertical synchronizing signal generator, executed on the circuitry, for generating an estimated vertical synchronizing signal based on the clock signal and the data enable signal; and
an image signal processor for receiving the image signal from the output circuit, generating the processed image signal by performing, on the image signal, predetermined processing that uses the estimated vertical synchronizing signal generated by the estimated vertical synchronizing signal generator, and outputting the processed image signal to the receiving circuit, a controller of the receiving circuit receiving the processed image signal from the image signal processor and receiving the clock signal and the data enable signal from the interface module.

6. The image processing device of claim 5, wherein the estimated vertical synchronizing signal generator includes:
an edge detecting submodule, executed on the circuitry, for detecting one of a rising edge and a falling edge of the data enable signal;
a counting submodule, executed on the circuitry, for counting a clock number of the clock signal in a period of time from a time point $t_n$ at which the one of the rising and falling edges is detected by the edge detecting submodule, to a time point $t_{n+1}$ at which the one of the rising and falling edges is next detected by the edge detecting submodule;
a threshold generating submodule, executed on the circuitry, for setting, as a threshold $S_n$, a value obtained by multiplying a counter value $T_n$ of the clock number by a coefficient k ($T_n \times k$), the counter value $T_n$ obtained by the counting of the counting submodule in a period from a time point $t_{n-1}$ to the time point $t_n$, the time point $t_{n-1}$ being a time point at which the one of the rising and falling edges is detected by the edge detecting submodule and which is immediately previous to the time point $t_n$;
a comparing submodule, executed on the circuitry, for comparing the threshold $S_n$ with the counter value of the clock number counted by the counting submodule; and
an estimated vertical synchronizing signal acquiring submodule, executed on the circuitry, for generating the estimated vertical synchronizing signal that changes a signal value thereof to be active, when the comparing submodule detects that a magnitude relationship between the threshold $S_n$ and the counter value of the clock number counted by the counting submodule is changed.

7. The image processing device of claim 6, wherein the threshold generating submodule sets the threshold $S_n$ by having the coefficient as "2".

8. The image processing device of claim 5, wherein the image signal processor performs image signal processing at least in a vertical direction.

* * * * *